United States Patent

Neumann et al.

[15] 3,675,378
[45] July 11, 1972

[54] MULTI-LEVEL AUTOMATIC STORAGE AND RECOVERY SYSTEM FOR AIRCRAFT

[72] Inventors: Malcolm A. Neumann, San Diego; Arnold Hunsberger, Dellzura, both of Calif.

[73] Assignee: Cubic Corporation, San Diego, Calif.

[22] Filed: June 11, 1970

[21] Appl. No.: 45,310

[52] U.S. Cl. .................................. 52/65, 52/174, 214/16.1 A
[51] Int. Cl. .......................................................... E04h 6/06
[58] Field of Search ..................... 214/16.1 A, 16.1 R; 52/65

[56] References Cited

UNITED STATES PATENTS

| | | | |
|---|---|---|---|
| 636,324 | 11/1899 | Ehrenberg | 214/16.1 A |
| 1,582,099 | 4/1926 | Trask | 214/16.1 A |
| 1,593,665 | 7/1926 | Moores | 214/16.1 A |
| 2,964,144 | 12/1960 | Wheeler | 214/16.1 A |
| 3,398,843 | 8/1968 | Smith | 214/16.1 A |
| 3,405,816 | 10/1968 | Beau et al. | 214/16.1 A |

FOREIGN PATENTS OR APPLICATIONS

| | | | |
|---|---|---|---|
| 580,784 | 9/1924 | France | 214/16.1 A |
| 649,400 | 11/1962 | Italy | 214/16.1 A |
| 458,984 | 12/1936 | Great Britain | 214/16.1 A |

*Primary Examiner*—Gerald M. Forlenza
*Assistant Examiner*—R. Johnson
*Attorney*—Carl R. Brown

[57] ABSTRACT

A storage facility having a plurality of multi-level, non-rotatable, support frames, and rotatable spider frames with circumferentially spaced aircraft storage stalls peripherally supported on the support frames for communication with an elevator that has a turntable for aligning an aircraft with a selected stall, and individual, aircraft-carrying, wheeled pallets being moved by a power tractor on rails by an automatic control system to and from an external loading dock to and from the selected stalls in a series of sequential steps that are initiated by coded signals identifying each aircraft with each stall.

8 Claims, 25 Drawing Figures

Fig. 1

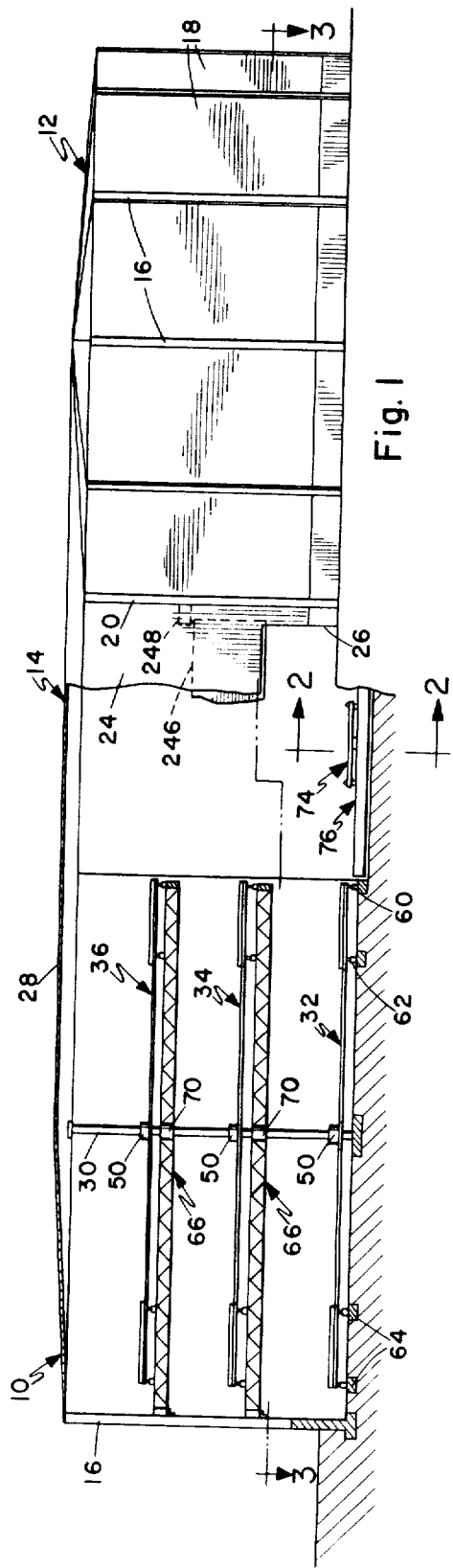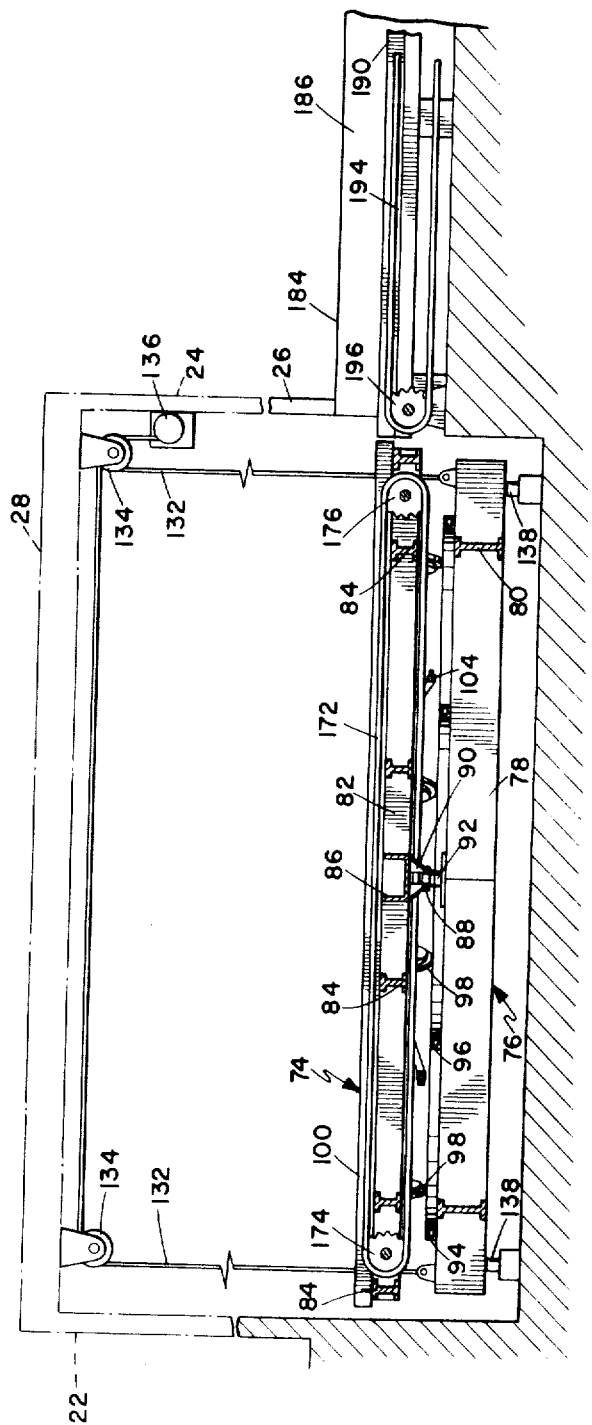
INVENTORS
MALCOLM A. NEUMANN
ARNOLD HUNSBERGER

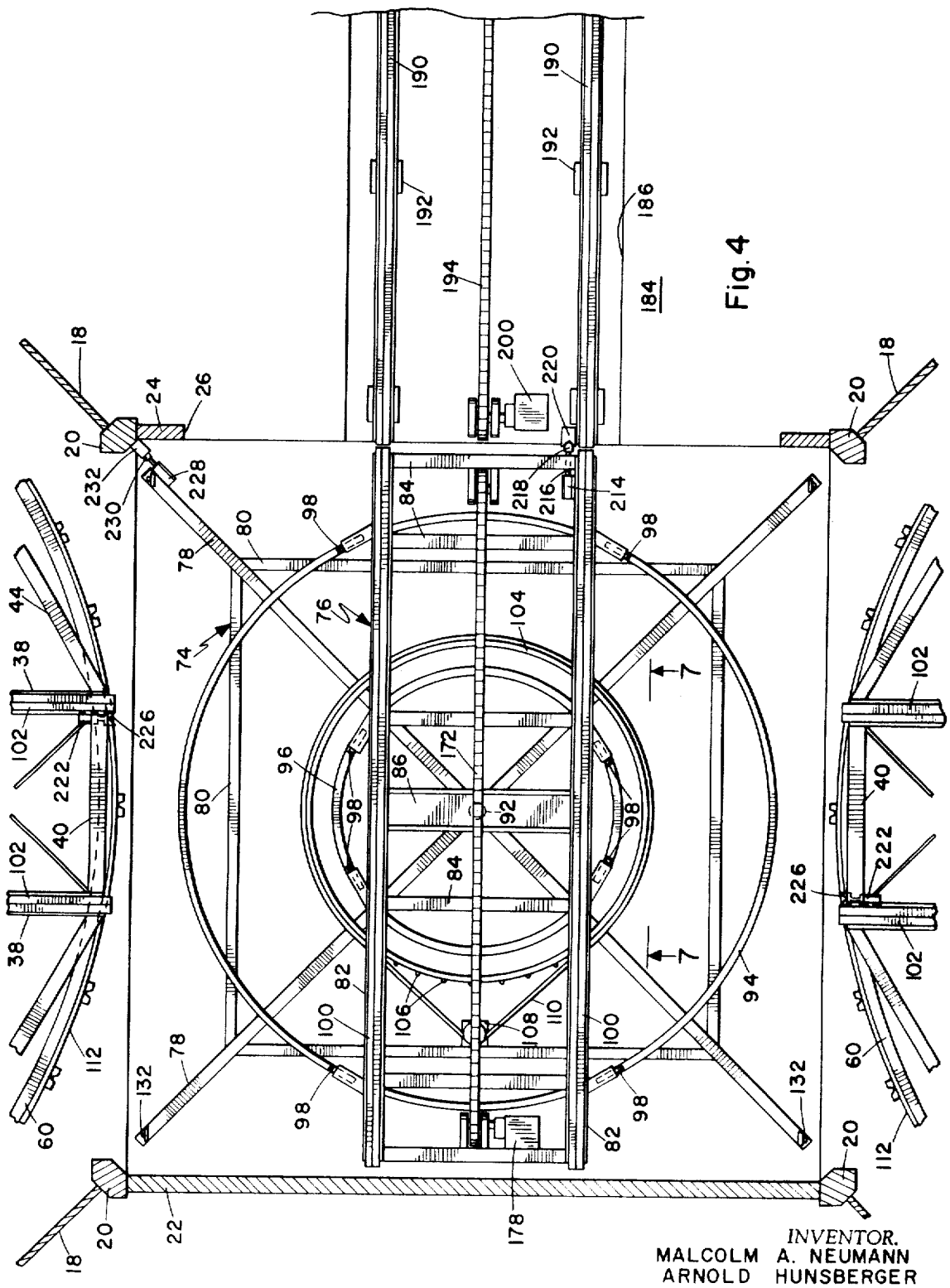

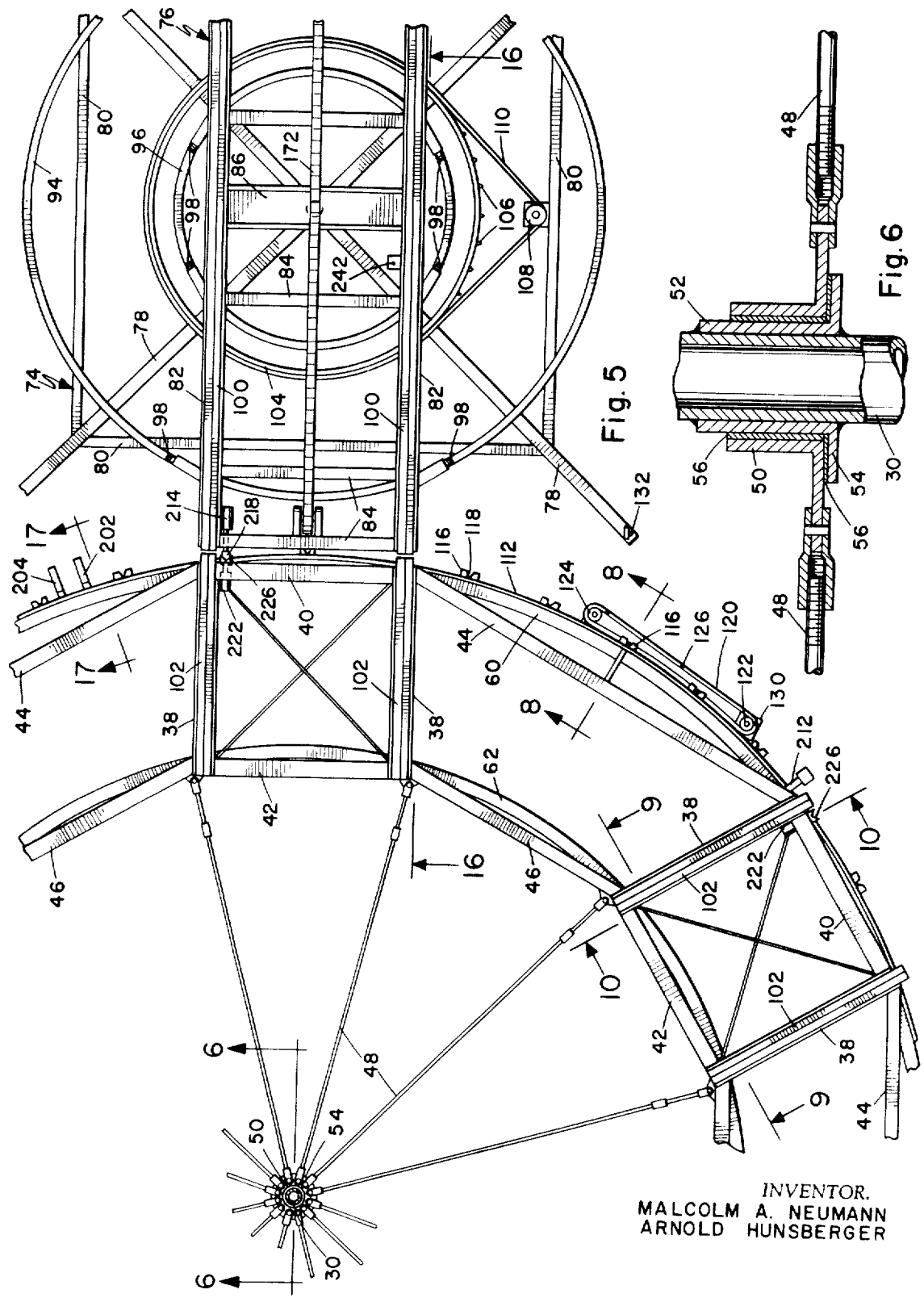

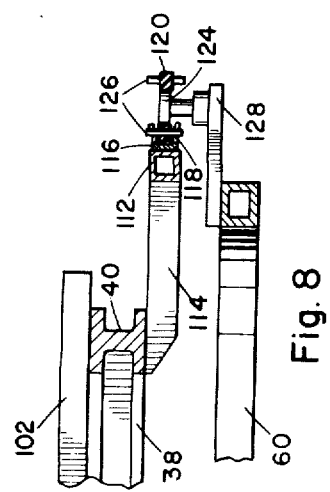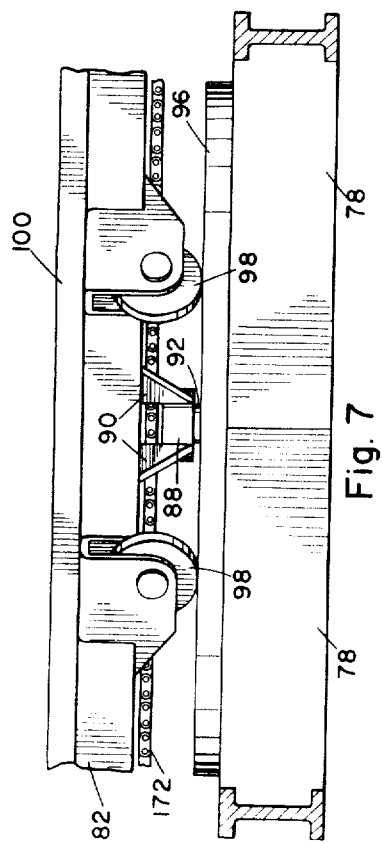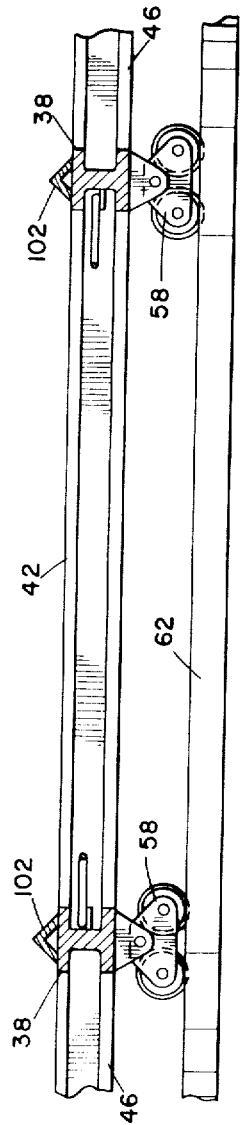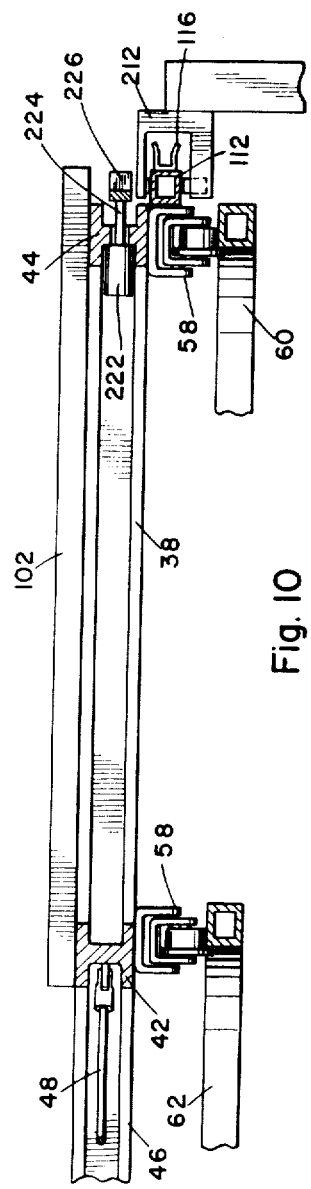

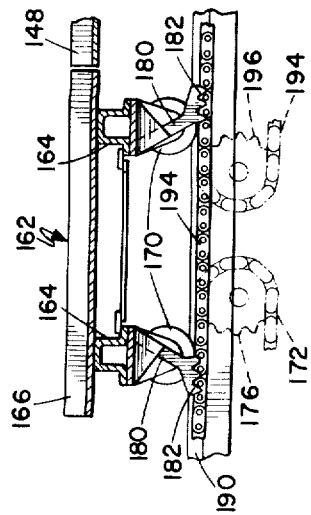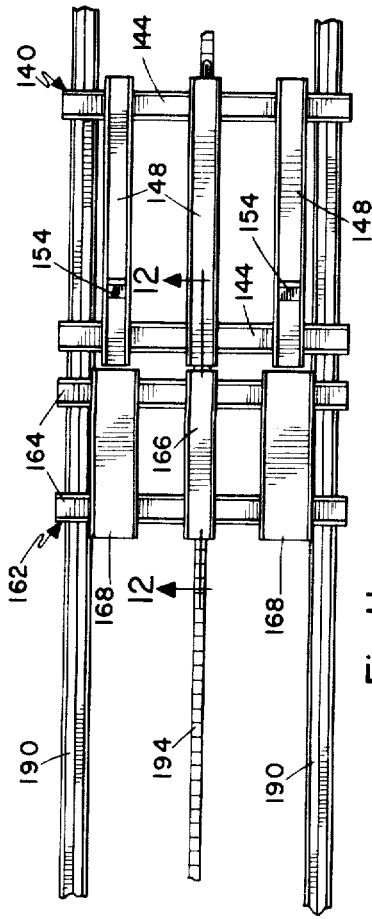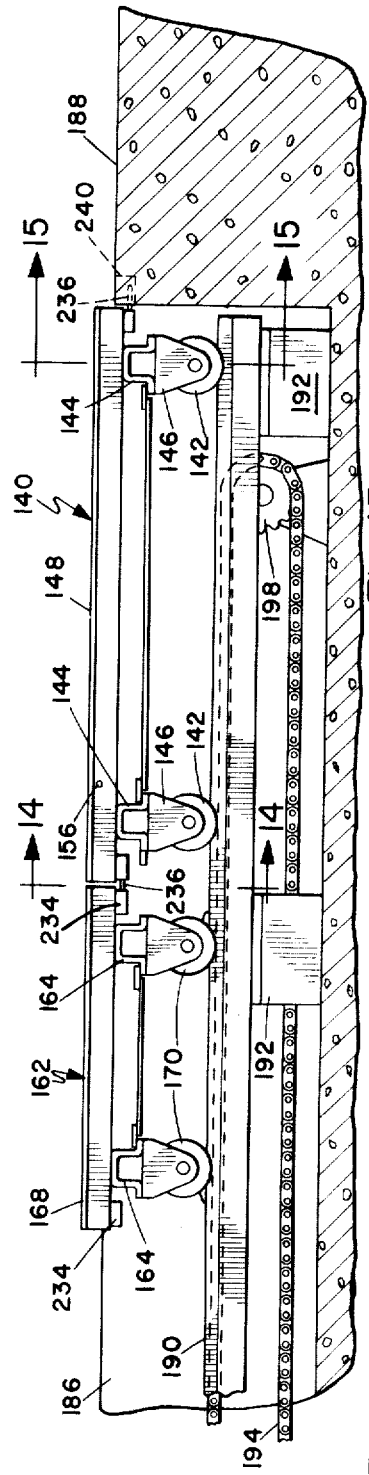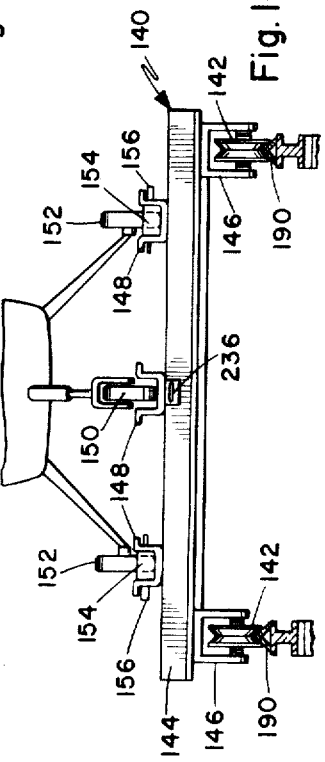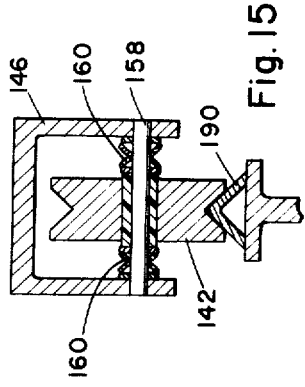

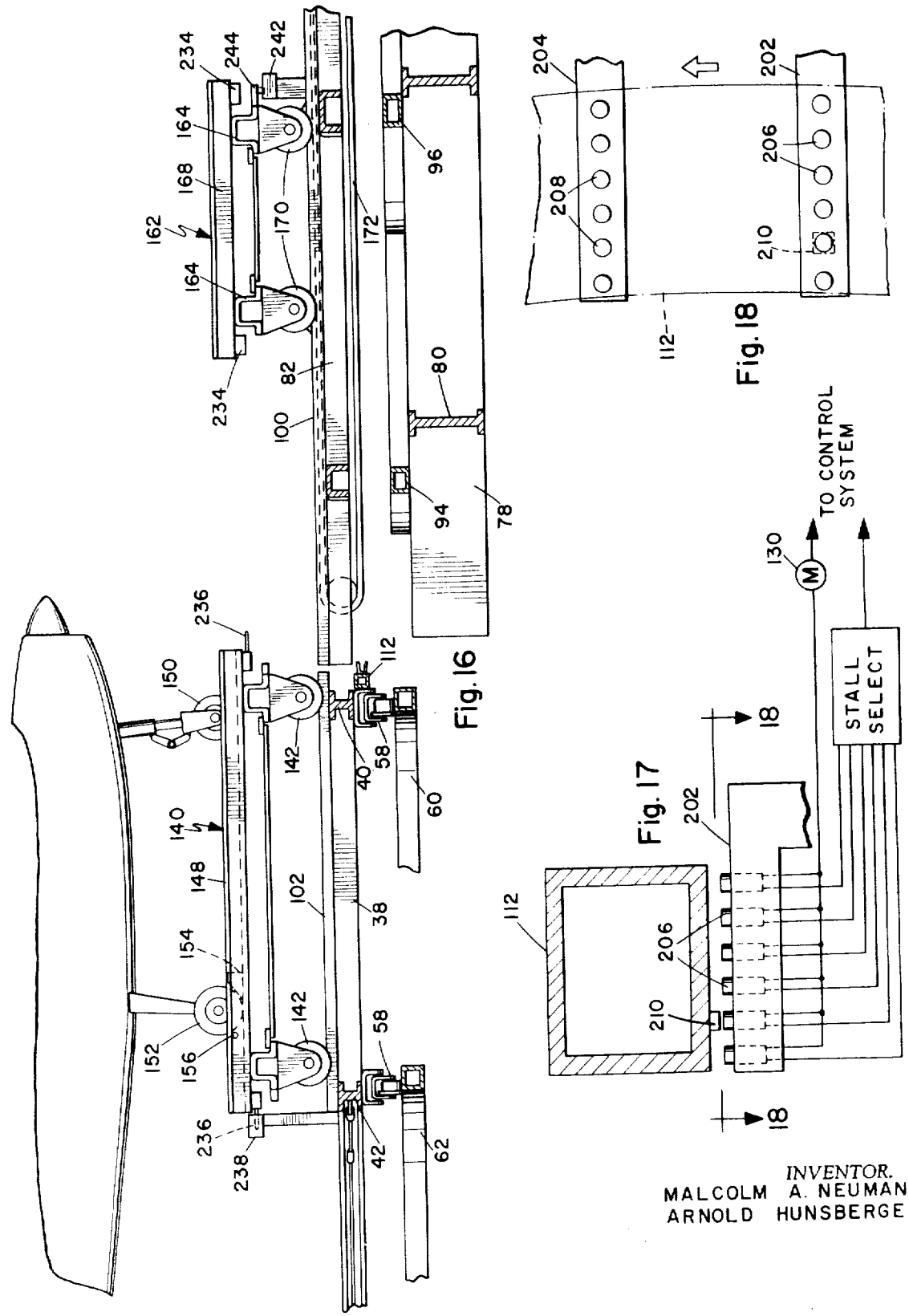

PATENTED JUL 11 1972 3,675,378

INVENTOR.
MALCOLM A. NEUMANN
ARNOLD HUNSBERGER

INVENTORS
MALCOLM A. NEUMANN
ARNOLD HUNSBERGER

MULTI-LEVEL AUTOMATIC STORAGE AND RECOVERY SYSTEM FOR AIRCRAFT

BACKGROUND OF THE INVENTION

In many airports, the ground space for parking or storing aircraft is becoming limited to the extent that the land is too valuable to be used for aircraft parking. Further, where it is desired to store aircraft in covered storage facilities such as hangers and the like to protect against exposure to weather conditions and the sun, the cost of such hanger facilities plus the cost of the land occupied make such facilities for parking or storing aircraft too expensive for the service provided. Thus it becomes apparent that vertical storing or stacking of aircraft will be necessary in many airport facilities to accommodate at a reasonable cost the parking or storage of aircraft.

There are several known systems for multi-level hanger storage of aircraft. These known systems usually provide elevator means for lifting the aircraft to multi-level floors, which floors may be rotated or have a fixed position. Some proposed systems also have employed to a limited degree, the checking in and out of aircraft to the multi-level rotary hanger. These systems have the limitation of requiring the construction of large, strong and expensive buildings to support the weight of the stored aircraft and at the same time provide the large space normally required to store a number of aircraft.

Where the vertical floors are fixed, then ingress and egress of the aircraft into the storage facility at multi-levels presents considerable problems relative to lifting the aircraft to the various levels and positioning the aircraft in the hanger facility. It is, of course, disadvantageous to have to move several aircraft in order to move one aircraft from a storage facility. While rotary hangers have provided some means for efficient multiple storage of aircraft in multi-level hanger facilities, the floors in such facilities are normally of heavy construction. The rotation of a plurality of heavy floors, either simultaneously or individually, presents many engineering problems relative to, for example, bearing support and starting and stopping of the multiple floors, as to make such facilities that are capable of operating with any degree of practicality, prohibitively expensive. Also such facilities often use means for moving the aircraft in and out of the vertical hanger facilities in such a manner as to require the employment of expensive personnel and the construction of a facility that is safe for continuous use by personnel. The engineering problems encountered in such known vertically multi-level hanger facilities, including known rotary hanger facilities, and the expense of operating such facilities and the personnel problems involved, have seriously restricted the use of such facilities in the past.

Thus it is advantageous to have a new and improved storage facility capable of providing multi-level light weight frame structures for supporting aircraft efficiently in a housing structure on a multi-level basis and that has control means that is capable of automatically moving the aircraft into a given predetermined storage area in the storage facility and that will retrieve a particular aircraft and deliver the aircraft to the loading ramp without requiring direct movement of the aircraft by personnel.

SUMMARY OF THE INVENTION

In an exemplary embodiment, a storage facility for storing vehicles such as aircraft or the like has a building with one or more silo type housing structures. Each silo structure has a plurality of vertically spaced rotatable spider frames with a plurality of individual aircraft supporting stalls. The spider frames rotate around a center shaft to which is fixed a non-rotatable support frame. Each support frame supports a spider frame at points below the stalls. The support frames and the spider frames have a generally circular configuration and the building has a generally cylindrical shape.

More specifically, the frame structure extends from the non-rotating center shaft to the walls of the silo structure and the rotating spiders move on rails on the frame structure. The spider frames have at least two concentrically arranged sets of bogies that fit under the stalls and thus support the spider and the aircraft positioned on the spider at substantially the aircraft's center of gravity. Each of the stalls have radially directed rails for receiving a pallet that carrys the aircraft. Thus the frame and spiders do not form floor structures as such and the support frame may be made of light-weight, strong frame construction and the spider frame only requires that structural strength necessary to carry the aircraft at the stalls. So the rotatable spider frames, even with airplanes positioned at each stall, has a relatively low inertia making the spider frames and supported aircraft relatively easy to rotate and to start and stop within pre-determined aligned positions in the silo housing structure.

The aircraft are lifted into the silo structure by an elevator that is positioned in a housing that joins the silo structure. The elevator structure may be positioned between two silo structures in the storage facility building or there may be three silos connected to the elevator housing structure and serviced by the elevator. The aircraft are moved onto the elevator on wheeled pallets and the elevator has a turntable allowing the aircraft to be correctly turned for being moved tail first into a selected stall on the wheeled pallet. This is accomplished by a power tractor that drives the pallet to a loading area where an aircraft to be stored is loaded onto the pallet and on which the aircraft remains during its period of storage at a given stall. Each stall has a pallet with aircraft wheel receiving members positioned thereon that are aligned and spaced for the given aircraft that is to be stored in that stall. When the particular aircraft for a particular stall is to be moved from the loading ramp to the stall, the aircraft is moved onto the pallet and the power tractor drives the loaded pallet onto the elevator which moves if necessary to the selected floor. The tractor then drives the pallet into the stall and the elevator returns to the waiting position. An aircraft is recovered from a stall by a coded signal for the particular stall, causing the elevator to move, if necessary, to the proper level and the turntable to rotate the tractor into alignment with the pallet. The mechanism in the meantime has rotated the particular stall of the aircraft supporting spider into alignment with the opening to the elevator. The tractor engages the pallet and moves the pallet and aircraft into the elevator that lowers the aircraft, pallet and tractor to ground level where the turn-table then rotates tractor, pallet and aircraft to alignment with the exit allowing the aircraft to be moved out onto the dock or loading area.

This complete operation is automatically controlled by a step sequence system that does not require person operation except where overrides may be necessary to correct malfunctions. The system incorporates safety interlocks so that each step in the sequence must be complete before the next step begins. The aircraft is thus stored in what can be a completely protected, theft-proof, security storage facility and can be recovered only by a coded signal, which may be given by any of a variety of means such as a key, card, audio signal, optical means, radio signal or other directly or remotely applied means.

It is therefore an object of this invention to provide a new and improved method and apparatus for multi-level automatic storage and recovery of aircraft.

It is another object of this invention to provide a new and improved automatic storage and recovery system for aircraft that will move an aircraft from a loading position to a specific storage stall in a multi-level facility automatically and upon command, and will similarily return a selected aircraft to the loading position.

It is another object of this invention to provide a new and improved multi-level automatic storage and recovery system for aircraft that employs a plurality of rotatable floors, which floors have a relatively light weight and inexpensive construction and which light weight construction is relatively easy to move in a controlled manner.

It is another object of this invention to provide a new and improved aircraft storage and recovery system in which the entire operation of storage and recovery is performed in sequential steps automatically, each step of which must be completed before the next step can start, so that improper operation and possible damage to the aircraft are substantially avoided.

Another object of this invention is to provide a new and improved storage facility for storing vehicles and the like which storage facility has a plurality of rotatable floors, which rotatable floors have a relatively light and inexpensive construction and which floors may be rotated without requireing complicated, large and expensive bearing structures, power sources and force transmitting linkages.

Other objects and many advantages of this invention will become more apparent upon a reading of the following detailed description and an examination of the drawings wherein like reference numerals designate like parts throughout and in which:

FIG. 1 is a front elevation view, partially cut away, of the complete storage building.

FIG. 2 is an enlarged sectional view taken on line 2—2 of FIG. 1.

FIG. 4 is an enlarged view of the central portion of FIG. 3.

FIG. 5 is a partial top plan view of the elevator and one spider, showing the drive means.

FIG. 6 is an enlarged sectional view taken on line 6—6 of FIG. 5.

FIG. 7 is an enlarged sectional view taken on line 7—7 of FIG. 4.

FIG. 8 is an enlarged sectional view taken on line 8—8 of FIG. 5.

FIG. 9 is an enlarged sectional view taken on line 9—9 of FIG. 5.

FIG. 10 is an enlarged sectional view taken on line 10—10 of FIG. 5.

FIG. 11 is a top plan view of the tractor coupled to an aircraft pallet.

FIG. 12 is a sectional view taken on line 12—12 of FIG. 11.

FIG. 13 is an enlarged sectional view taken on line 13—13 of FIG. 3.

FIG. 14 is a sectional view taken on line 14—14 of FIG. 13.

FIG. 15 is an enlarged sectional view taken on line 15—15 of FIG. 13.

FIG. 16 is an enlarged sectional view taken on line 16—16 of FIG. 5.

FIG. 17 is an enlarged sectional view taken on line 17—17 of FIG. 5, showing the spider drive shut-off means.

FIG. 18 is a view taken on line 18—18 of FIG. 17.

DESCRIPTION OF THE PREFERRED EMBODIMENT

Figure 3:
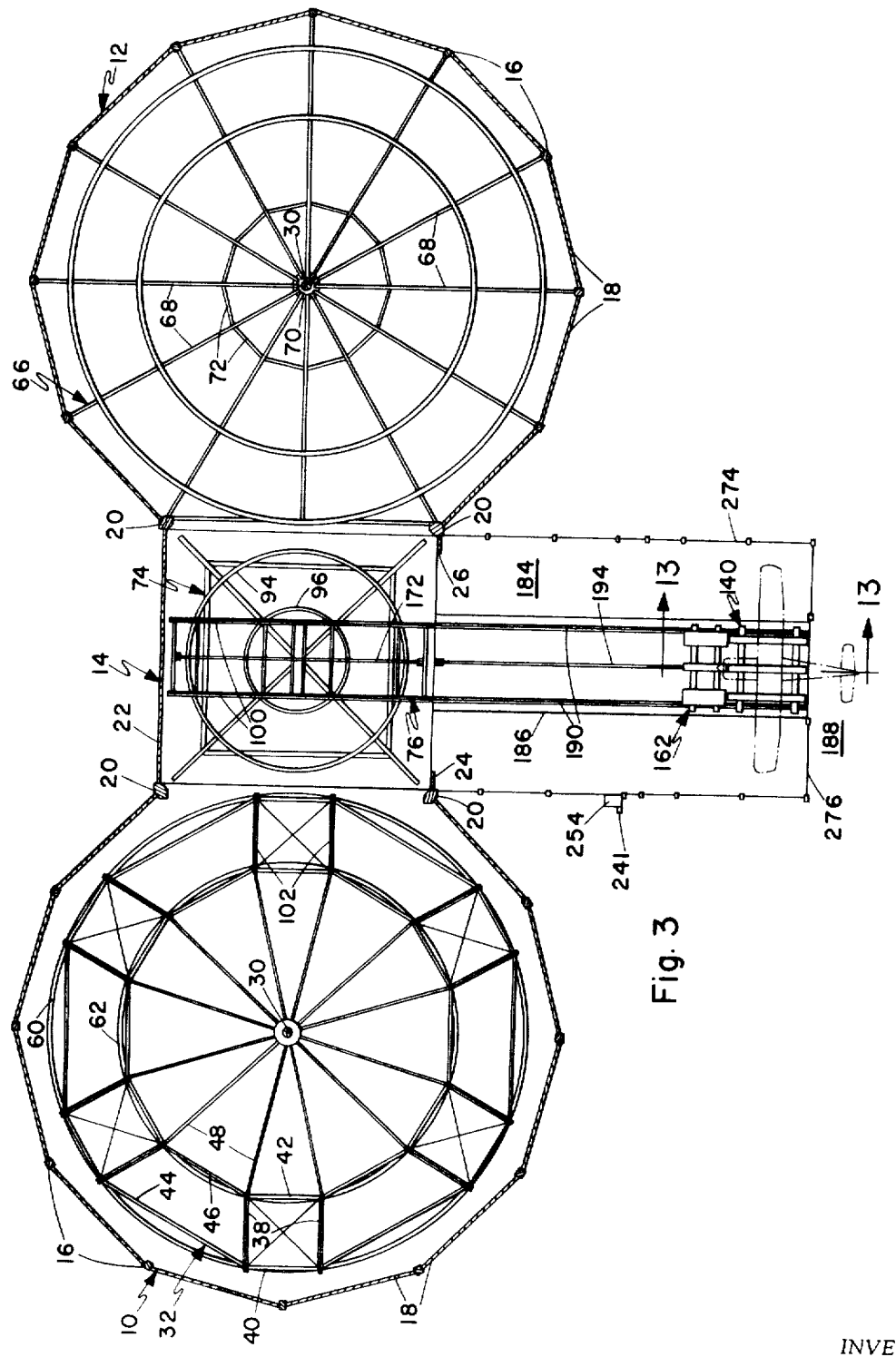
FIG. 3 is a sectional view taken on line 3—3 of FIG. 1.

Referring to FIGS. 1, 2 and 3, in the configuration illustrated, the storage facility building comprises a left silo 10 and a right silo 12. The silos are joined by an elevator tower 14 in a dumbbell-like arrangement in plan form. A single silo can be used with the elevator tower 14 or a third silo can be added at the rear of the elevator tower, depending on the number of aircraft to be stored. Each silo is illustrated as having three levels of storage with each level having six stalls, but other combinations can be used. The specific construction and materials used are not critical, the arrangement shown being typical.

Each silo is multi-sided, with vertical columns 16 supporting walls 18. The elevator tower 14 is substantially square in plan, with corner columns 20 at the junctions with the silos and a rear wall 22 and a front wall 24 with a door opening 26. The sides of the elevator tower are open into the silos and a continuous roof 28 covers the structure.

Referring to FIG. 3, there is illustrated a typical rotating floor in the left silo and a fixed floor frame in the right silo. The left silo 10 will be described in detail with the understanding that the right silo 12 is similar in all respects. Silo 10 has a fixed vertical center post 30 that supports three vertically spaced rotatable spider frames 32, 34 and 36, numbered from bottom to top. These spiders are all of similar construction, which is illustrated in detail in FIGS. 5, 6, 8, 9 and 10.

Each stall of the spider frame is a rectangular frame having spaced parallel side beams 38 joined by an outer beam 40 and an inner beam 42. The stalls are interconnected into the multi-sided spider frame by outer connecting beams 44 and inner connecting beams 46. The spider frame is stabilized by tie rods 48 extending radially from a central collar 40, see FIGS. 5 and 6, to the inner ends of side beams 38. Fixed to center post 30 is a bearing sleeve 52 having a flange 54 on which collar 50 rests. The sleeve 52 and the flange 54 have facings 56 of wear resistant material, such as brake lining material, for a smooth rotating support. Beneath the corners of each stall are secured wheeled bogies 58, see FIGS. 7, 9 and 10, that ride on an outer circular rail 60 and an inner circular rail 62 and provide a steady support under each stall. For the lower spider 32, the circular rails 60 and 62 are mounted on foundation members 64 in the floor of the building, as illustrated in FIG. 1.

The middle and upper spiders 34 and 36 are each supported on a fixed floor frame 66, illustrated in FIG. 3. The floor frame comprises a plurality of support beams 68 extending radially from columns 16 to a fixed collar 70 on center post 30, with bracing members 72 inserted between the beams where necessary to provide the desired rigid structure. Circular rails 60 and 62 are secured on top of beams 68 in concentric alignment with the center post 30, which functions primarily as a centering bearing for the spiders and carries very little of the load. The open frame structure is practical throughout the building since, in normal use, no personnel are required inside and floors are not necessary.

An elevator 74 is positioned in the elevator tower 14 and supports a rotatable turntable 76. The elevator has an open frame structure with diagonal beams 78 braced by cross members 80. The specific structure is not critical. Turntable 76 comprises a pair of parallel side beams 82 spaced apart at the same distance as side beams 38 of the spider stall and cross bars 84 rigidly interconnect the side beams. At the center of the turntable is a channel member 86, and spaced below the channel member is a bearing sleeve 88 supported by gussets 90. The sleeve 88 fits over a fixed post 92 projecting upwardly from the intersection of diagonal beams 78 and provides the center bearing for the turntable. Supported on top of the elevator frame is an outer circular rail 94 and an inner circular rail 96 that are concentric with bearing sleeve 88. Rollers 98 are mounted on side beams 82 to ride on rails 94 and 96 and carry the load of the turntable.

Supported on the top of side beams 82 are tracks 100 that have an inverted V cross section. Each stall of each spider has corresponding tracks 102 fixed on top of side beams 38. The turntable tracks will thus register with the tracks of any stall brought into alignment with the turntable.

Various drive means can be used to rotate the turntable. The arrangement illustrated includes a drive ring 104 fixed to the underside of the turntable and having peripheral teeth or pins 106. Mounted on one cross member 80 is a drive motor 108, from which a drive belt 110 extends around the drive ring 104.

The drive belt is perforated to fit the pins 106, or may be a chain with suitably spaced links for a positive drive.

Each spider is individually rotated with one suitable means for accomplishing this function being illustrated in FIGS. 5 and 8. A drive ring 112 is fixed to the underside of the spider at its outer periphery and is secured to the main beam structure at the stalls and is held by supports 114 between the stalls. Drive ring 112 has circumferentially spaced teeth 116, each of which is a short channel element having vertically opposed notches 118. A drive belt 120, stretched between pulleys 122 and 124, rides against the outside surface of drive ring 112 and is retained in the channeled teeth 116. The belt has vertical pins 126 spaced to engage the notches 118 and the length of the belt illustrated is such that at least two teeth are in simultaneous driving engagement. Pulleys 122 and 124 are mounted on brackets 128 extending from outer rail 60 with pulley 122 being driven by a suitable motor 130.

The elevator 74 may be raised and lowered by any conventional means, with a known, suitable floor indexing means for stopping at selected floors. For purposes of illustration, an overhead type of hoist is illustrated with cables 132 extending from the ends of diagonal beams 78 and over pulleys 134 in the top of the building to a hoist motor 136. Counterweighting (not shown) may be incorporated in any well known manner to reduce the load on the motor. In the down position, the elevator rests on bumpers 138 that hold tracks 100 in horizontal alignment with tracks 102 of the lower spider.

Each aircraft is carried and stored on a pallet 140, see FIGS. 11 through 15, that ride on grooved wheels 142 on tracks 100 and 102. In the form illustrated, the pallet comprises a pair of cross members 144 on which brackets 146 are mounted with the cross members supporting three longitudinal channel members 148 in a rigid frame structure. The center channel member 148 receives the nose wheel 150 of an aircraft and the outer channel members support and hold the main wheels 152, as illustrated in FIG. 14. The outer channel members are made adjustable in any suitable manner to fit the main wheels spacing of a specific aircraft, since each aircraft will be assigned a particular stall and adjusted pallet on a regular basis. To hold an aircraft in correct position on the pallet, chocks 154 are secured in the outer channel members 148 and removable lock pins 156 are inserted behind the chocks to hold the main wheels 152. Other retaining or tie down means may be equally suitable, depending on the aircraft. In the secured position with the pallet in its selected stall, the effective weight of the aircraft is substantially centered between spider supporting rails 60 and 62 for optimum load distribution. To allow for slight deviations in track alignment, each wheel 142 is mounted in its bracket 146 on an axle 158 with cupped or belleville type washers 160 on each side of the wheel, as illustrated in FIG. 15. This provides spring centering and permits limited lateral motion of the wheel.

The pallet is driven by a tractor 162, that resembles a short version of the pallet, and has cross members 164 and three longitudinal channel members that align with channel members 148. The center channel member 166 is similar in width to the corresponding member of the pallet, but the outer channel members 168 are made substantially wider to accommodate the range of wheel spacings to which the pallet can be adjusted. Tractor 162 rides on wheel units 170 that are similar in all respects to the structure illustrated in FIG. 15.

The tractor, when positioned on the elevator, is powered by an endless drive chain 172 extending along the longitudinal axis of turntable 76 between sprockets 174 and 176, sprockets 174 being driven by a motor 178. On the underside of the tractor, at opposite ends, are downwardly projecting traction arms 180 having teeth 182 that engage in the drive chain 172, as illustrated in FIG. 12. The traction arms 180 are shown fixed, but can be hinged to allow the tractor to be detached from the drive.

Externally of the building is an apron area 184 having an elongated pit 186 extending perpendicular to the front wall 24 and terminating at a loading dock 188. Positioned in pit 186 are parallel tracks 190 that are mounted on supports 192 and spaced to align with the turntable tracks 100 when the elevator is at its lowest level, as illustrated in FIG. 2. Centrally between tracks 190 is a drive chain 194 extending substantially the full length of the tracks and being supported and driven by sprockets 196 and 198. Drive motor 200 drives the sprocket 196. When the tractor 162 transfers between drive chain 172 and drive chain 194, as illustrated superimposed in broken line in FIG. 12, the dual traction arms 180 ensure that the drive is continuous.

Since the pallet must transfer between tracks on the spider, the turntable and in the apron area, precise alignment of the tracks is necessary. The spider, loaded with an aircraft, has considerable inertia in motion and simple limit switches may not be sufficient for accurate stopping. An arrangement illustrated in FIGS. 5, 17 and 18 uses two stages of limit switches that shut off the drive motor first and then applies the brake. Below the drive ring 112, at a convenient location, are two circumferentially spaced arms 202 and 204. Arm 202 carries a row of radially spaced switches 206 and arm 204 carries similarly spaced switches 208. Six switches are illustrated in each row, corresponding to the six stalls on a spider. The switches are of the magnetically actuated type and are individually operated by a magnet 210 positioned in the appropriate radial and circumferential location on the underside of drive ring 112. Switches 206 are all electrically connected to the spider drive motor 130 and are individually connected to the stall selecting means hereinafter described. Selection of a particular stall places a specific switch in the motor control circuit. With the spider in driven operation, magnet 212 will pass over the switch 206 corresponding to the selected stall and actuate that switch to shut off motor 130. The spider will then coast for a short distance to lose inertia, until magnet 210 passes over corresponding switch 208 that actuates a brake 212 and stops the spider. The brake may be of the conventional caliper type to grip the drive ring 112, as illustrated in FIG. 10, or may comprise any other suitable means for positively stopping the spider at a predetermined position. A similar arrangement, not shown, is used to index the turntable 76 at either of three positions, in alignment with a spider in either silo, or with the apron tracks.

The basic stopping and indexing system can be made to bring the various tracks to within an order of less than an inch of alignment. Where greater accuracy is preferred for smooth transfer of a pallet carrying a valuable aircraft, means for accomplishing final alignment can be combined with stow pin means for holding the movable elements in secure alignment. In such an embodiment, at one end of turntable 76 is an actuator 214 carrying an axially movable plunger with a wedge-like stow pin 218 on the end thereof. The actuator is illustrated mounted on one side beam 82 for convenience. Fixed to one track 190 is a stow pin socket element 220, see FIG. 4, shaped to receive the stow pin 216 with head 218 when the turntable tracks 100 are aligned with apron tracks 190. Actuator 214, that may be electrically or fluid operated, forces by the wedging action of the stow pin 218 in socket element 220 the final precise alignment of the tracks. A similar arrangement is used to align each stall with the turntable but, since the spiders must be operated independently of the turntable, the latch socket elements on the spiders must be movable. Actuator 222 is thus mounted on one side of beam 38 of each stall and has a plunger 224 carrying a socket element 226 to receive stow pin 218. Either the spider element or the turntable element of the stow pin can then be released.

The same type of stow pin mechanism is used to secure the elevator at each level. As illustrated in FIG. 4, an actuator 228 is mounted on the end of at least one diagonal beam 78, to drive a stow pin 230 into and out of engagement with a socket element 232 on the adjacent corner column 20. A similar socket element would be used at each level and stow pins could be used at more than one corner of the elevator for stability. It is to be understood that the stopping and indexing system including the alignment and holding actuators, stow pins and the like, are electrically controlled in a manner that will be described hereinafter.

Tractor 162 has a latch 234 which is operable to engage or disengage a latch tongue 236 on pallet 140. While this latch mechanism is electrically controlled, it may take the form of a railroad car type latch or other simplified form thereof. The pallet has a latch tongue 236 at each end so that the pallet can also be held in its stall by a latch 238 on the spider, see FIG.

16. In addition, a latch 240 at the dock area 188 holds the pallet securely when an aircraft is being loaded. Since the time required for loading and unloading an aircraft at the dock may vary, a restart switch 241 is provided at a convenient location so that the pilot can initiate continuation of the sequence when safe to do so. When not in use, the tractor 162 is held on the turntable by a stow pin 242 engaging a tongue 244 on the tractor, as illustrated in FIG. 16, in such a manner that stow pin 242 does not obstruct passage of the tractor and pallet. For control purposes, latches 238 and 240 and stow pin 242 include limit switches to signal completion of latching, suitable mechanisms being well known.

Door opening 26 is normally closed by a vertically moving door 246, driven by a motor 248. Conventional limit switches 250 and 252, illustrated in FIG. 20, control the upward and downward motion, respectively of the door.

Figure 19:
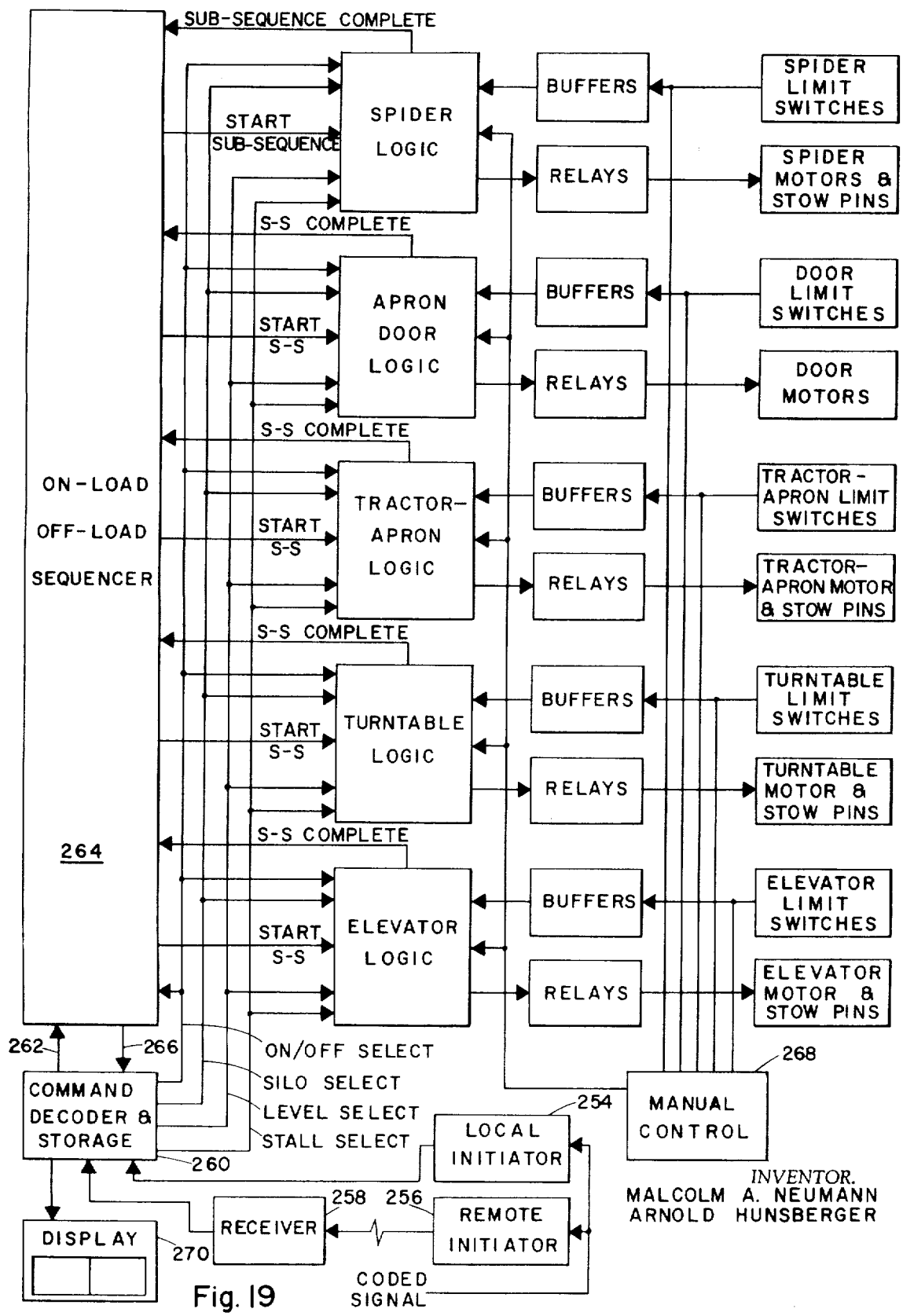
FIG. 19 is a block diagram of the control system.

Operation of the system is essentially a stepped sequence of switching actions that can be controlled by electro-mechanical, electronic, or other such means. The block diagram in FIG. 19 illustrates an electronic circuit using solid state logic to control the switching, the basic circuit components being well known. Operation is stated by a local initiator 254 or a remote initiator 256. The local initiator is conveniently located on the apron area, as indicated in FIG. 3, and may be actuated by a key, a coded card, a combination of push buttons, or other suitable means. Each regular user of the facility is provided with an individually coded identification relating to a particular stall for receiving and storing a specific aircraft. Only this code will produce the required starting signal from the initiator. The remote initiator 256 can be a transmitter producing a radio, audio or optical signal of the appropriate code to actuate a receiver 258 that is built into the local initiator housing 254 for convenience. The coded signal from either source is fed into a memory decoder 260, in which codes for all the stalls are stored in a suitable memory means. The incoming signal is decoded by decoder 260 to energize a particular combination of circuits that selects the specific silo, spider and stall in which the particular aircraft is programmed to be stored.

The decoder provides a sequence start signal in line 262 to a sequencer 264, which is a sequential switching circuit controlling the sub-sequence operation. Sequencer 264 provides a sub-sequence start signal to each sub-sequence logic circuit and in turn, the logic circuit actuates relays to supply power to the appropriate drive means in a predetermined sequence. Completion signals at each stage are fed to the logic circuit through buffer amplifiers, and the logic circuit provides a sub-sequence complete signal to the sequencer, allowing the next stage to begin. After all sub-sequences are completed, sequences 264 provides a sequence complete signal 266 to the decoder 260. In the event of breakdown or some other emergency, a manual control unit 268 is connected to the limit switches and logic circuit of each stage to permit over-riding or direct control of a particular sub-sequence. For convenience, a display unit 270 is coupled to decoder 260 to supply a visual readout of the identity of the aircraft or stall being serviced and, if necessary, the next aircraft to be handled as stored in the decoder.

Figure 20:
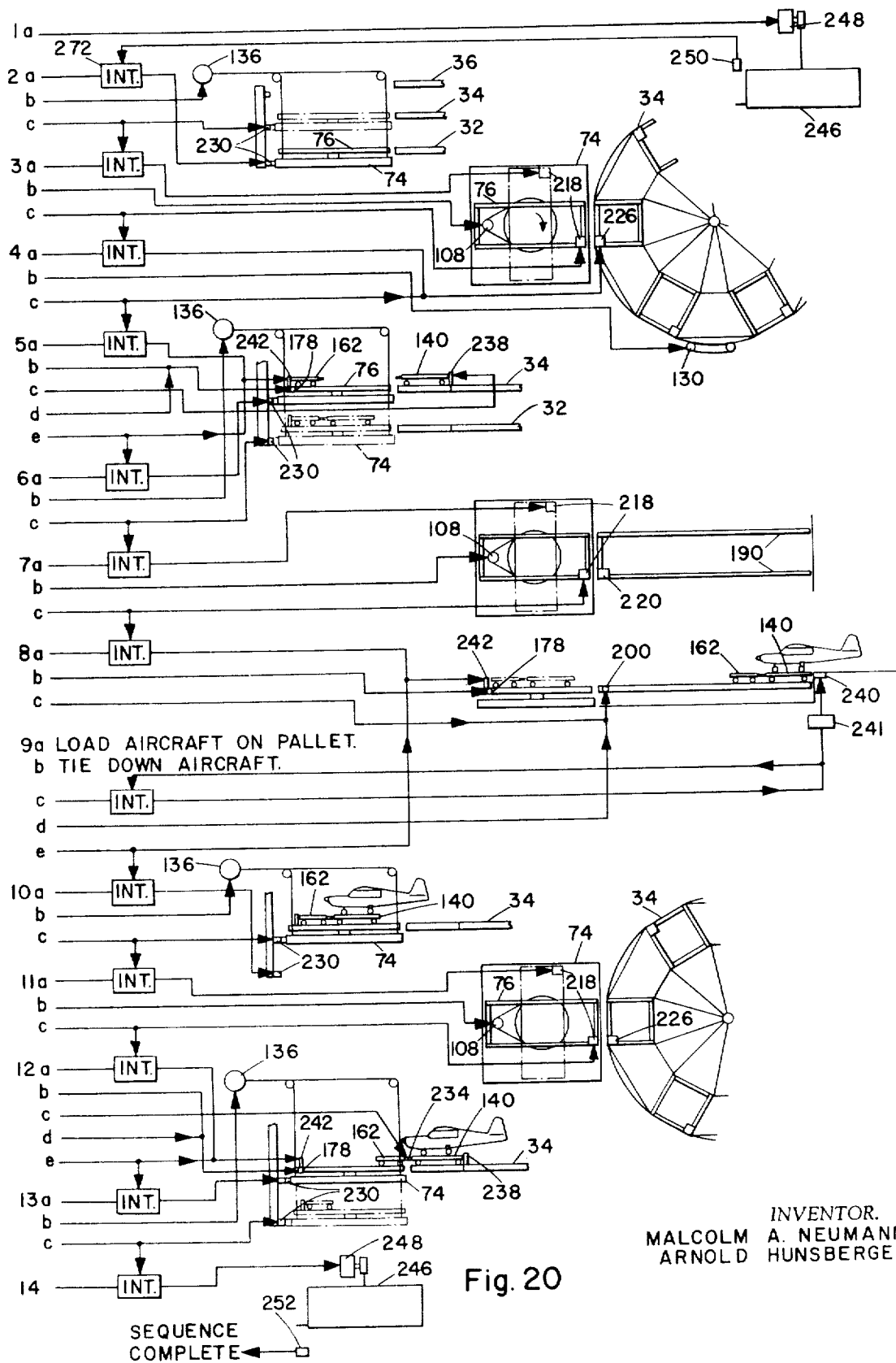
FIG. 20 is a step by step diagram of the sequence of functions in storing an aircraft.

The operation is best understood by following a complete sequence of steps. The operation of picking up and storing an aircraft is shown in FIG. 20, in which the numbered steps correspond to the following description:

AIRCRAFT PICK-UP AND STORAGE (INGRESS SEQUENCE)

| Step | Controlled Function | Operation |
|---|---|---|
| 1. | Door | a. Open door by motor 248 (Limit switch 250 actuated) |
| 2. | Elevator | a. Release elevator stow pins 230<br>b. Move elevator to selected level by motor 136 |
| 3. | | c. Activate elevator stow pins 230.<br>a. Release turntable stow pin 218.<br>b. Rotate turntable toward selected silo by motor 108.<br>c. Activate turntable stow pin 218. |
| 4. | Spider | a. Release spider stow pin 226.<br>b. Rotate spider (until selected stall is aligned with the turntable) by motor 130.<br>c. Activate spider stow pin 226. |
| 5. | Elevator Tractor Drive | a. Release tractor stow pin 242.<br>b. Move tractor to latch up with pallet by motor 178.<br>c. Release pallet-spider latch 238.<br>d. Move tractor and pallet to holding position on by motor 178.<br>e. Activate tractor stow pin 242. |
| 6. | Elevator | a. Release elevator stow pins 230.<br>b. Move elevator to ground level by motor 136.<br>c. Activate elevator stow pins 230. |
| 7. | Turntable | a. Release turntable stow pin 218.<br>b. Rotate turntable toward apron by motor 108.<br>c. Activate turntable stow pin 218. |
| 8. | Elevator and Apron Tractor Drive | a. Release tractor stow pin 242.<br>b. Transfer tractor and pallet to apron by motor 178.<br>c. Move tractor and pallet to engage docklatch 240 by motor 200. |
| 9. | Elevator and Apron Tractor Drive. | a. Load aircraft onto pallet.<br>b. Tie down aircraft.<br>c. Activate restart switch 241 and unlatch pallet from dock latch 240.<br>d. Move tractor and loaded pallet to holding position on turntable by motors 200 and 178.<br>e. Activate tractor stow pin 242. |
| 10. | Elevator | a. Release elevator stow pins 230.<br>b. Move elevator to selected level by motor 136.<br>c. Activate stow pins 230. |
| 11. | Turntable | a. Release turntable stow pins 218.<br>b. Rotate turntable toward selected silo by motor 108.<br>c. Activate turntable stow pin 218. |
| 12. | Elevator Tractor Drive | a. Release tractor stow pin 242.<br>b. Move tractor and pallet to latch to spider stall latch 238 by motor 178.<br>c. Release tractor-pallet latch 234.<br>d. Move tractor back to holding position by motor 178.<br>e. Activate tractor stow pin 242. |
| 13. | Elevator | a. Release elevator stow pin 230.<br>b. Move elevator to ground level by motor 136<br>c. Activate elevator stow pin 230. |
| 14. | Door | a. Close door by motor 248. (Limit switch 252 terminates sequence) |

Figure 22:
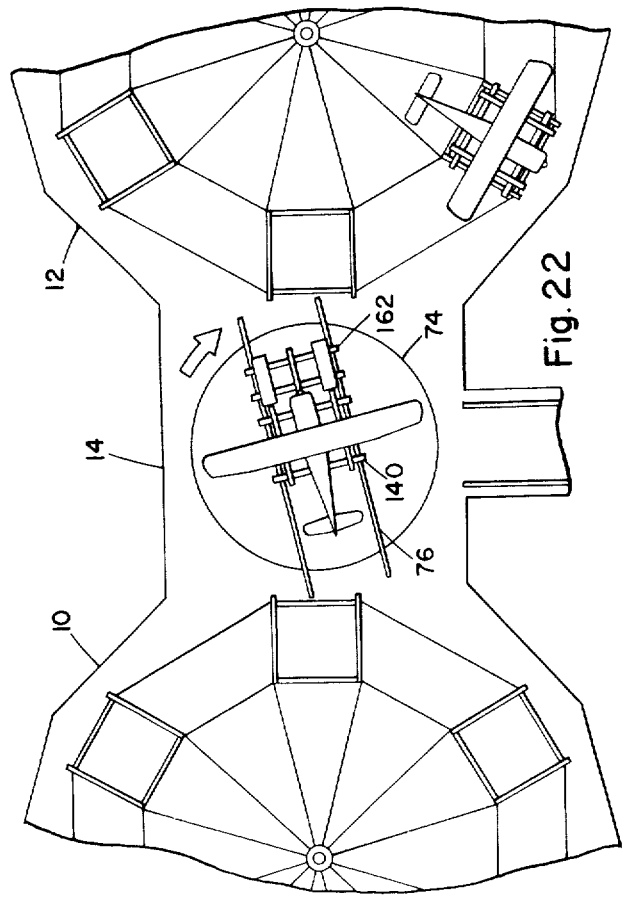
FIGS. 21 to 25 are diagrammatic views showing various steps in the storing and delivery of an aircraft.
Figure 23:
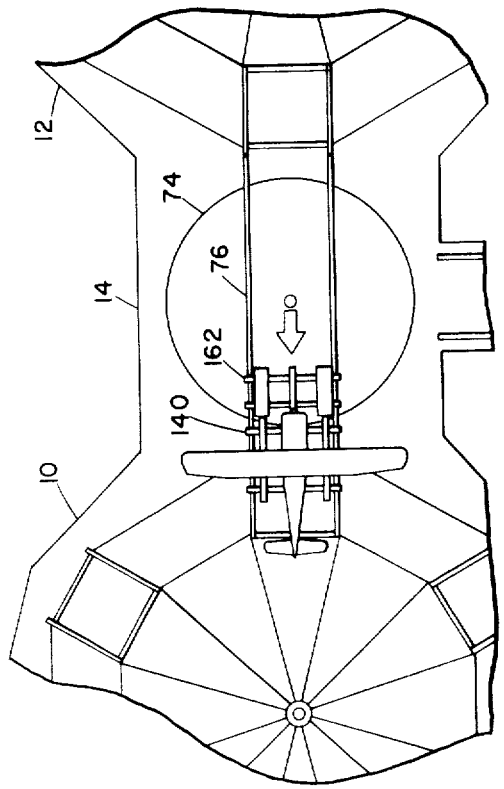
Figure 21:
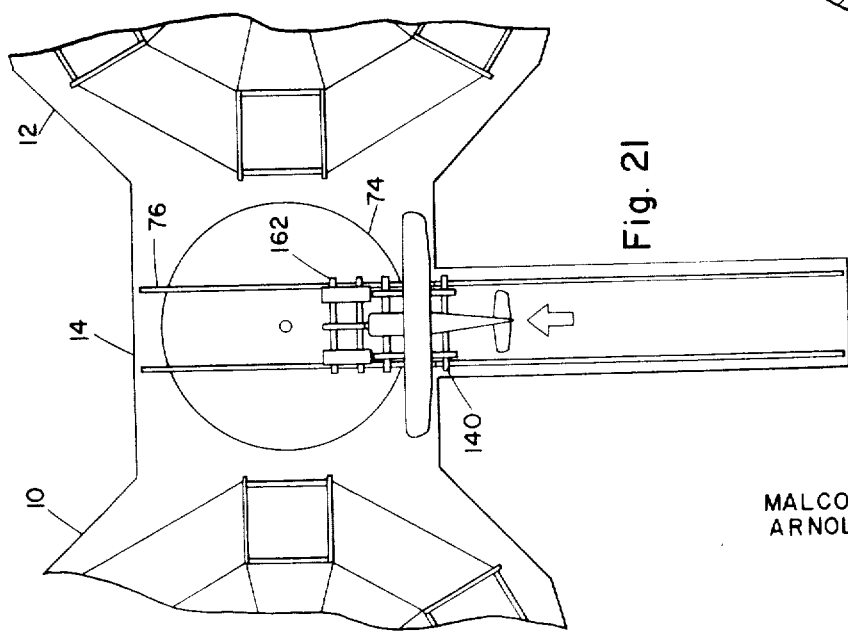

As the completion of each sub-sequence, the signal which initates the last step also trips an interlock, such as indicated at 272, which is merely a switching device to enable the next sub-sequence to begin only when safe to do so. It should be noted that FIG. 3 illustrates the condition at the completion of step 9b of the sequence. FIG. 21 illustrates the condition during step 9d; FIG. 22 illustrates the condition during step 11b; and FIG. 23 illustrates step 12b near completion.

Figure 25:
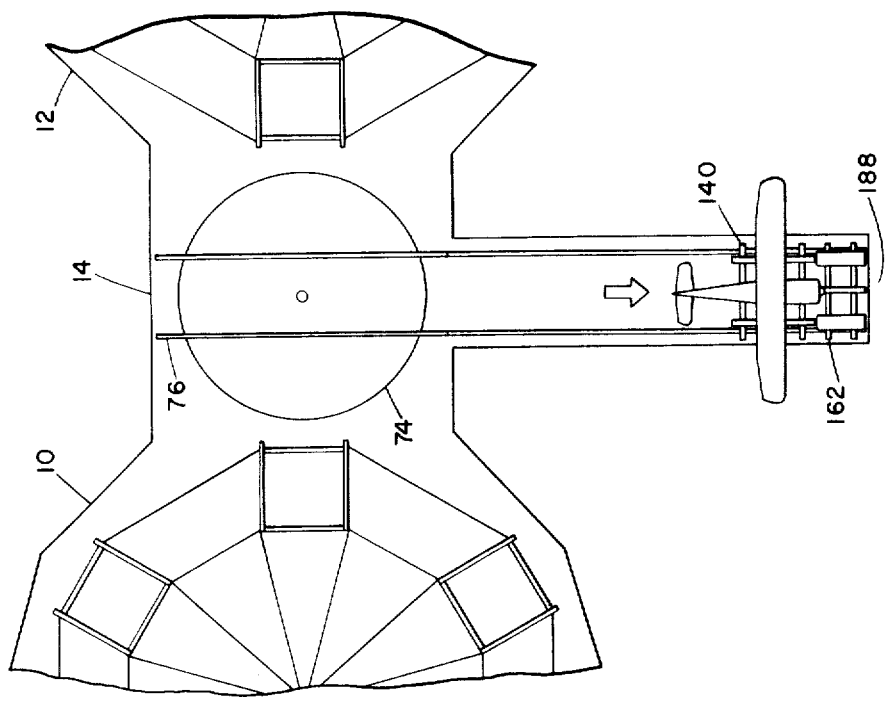
Figure 24:
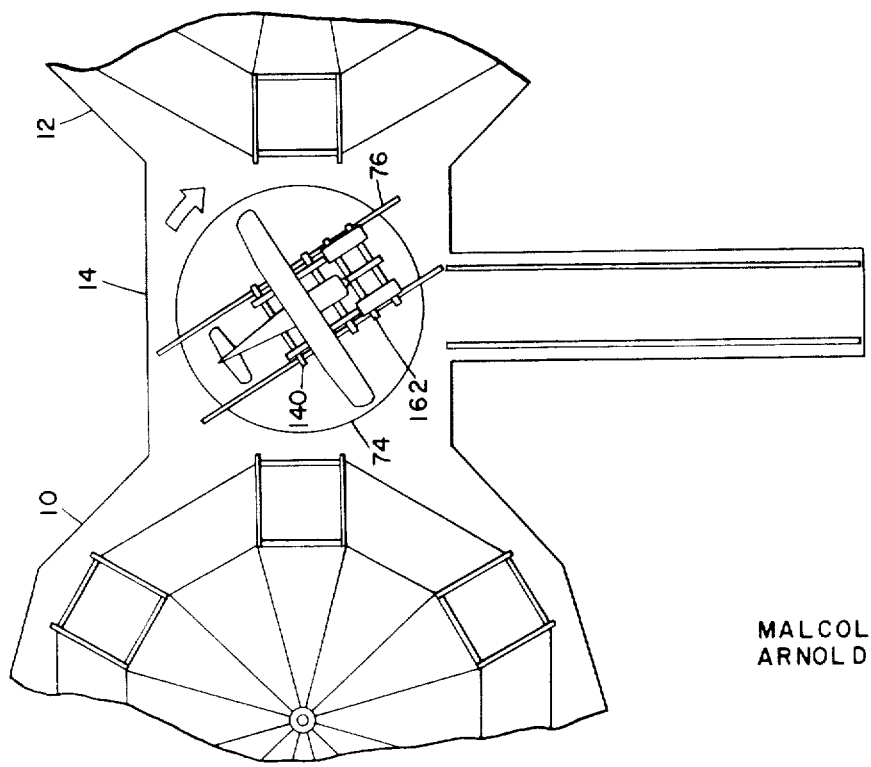

Recovery of an aircraft occurs in almost the same sequence of actions, except that the turntable is rotated to allow the tractor to preceed the pallet to the dock area. The aircraft is thus headed out and is taxied over the tractor after release from the pallet at ground level, except that the aircraft would be present on the pallet in steps 2 to 7 and absent in steps 10 to 12, and steps 9a and 9b would be substituted by removing the aircraft from the pallet. The recovery or egress sequence occurs in the same order as in FIG. 20. In this respect, FIG. 24 shows the condition in the recovery sequence corresponding to step 7b, and FIG. 25 corresponds to step 8c.

It will be obvious that, other than for routine maintenance, no personnel are required in the facility. To deter unauthorized entry, a fence 274 may be erected around the apron area with the end portion 276 at the dock being low enough to permit a low wing aircraft to pass over. Operation can be accelerated by using a remote initiator or transmitter in the aircraft, so that the pilot can call for the pallet while approaching the dock area. Recovery would then be made by a card or key inserted at a local initiator. The restart switch 241 can also be at the local initiator position, as indicated in FIG. 3, to ensure that the pilot is clear of the dock area when the pallet begins to move.

While actual dimensions are not critical, it should be noted that a single silo of about 100 feet diameter and with the arrangement shown, can hold 36 single or light twin engined aircraft. With the aircraft stored with their tails toward the center, there is ample clearance for the wings near the periphery of the spiders. The fully enclosed building provides complete protection and security for the aircraft.

Having described our invention, we now claim:

1. In a storage system for vehicles such as aircraft and the like,
   a multi-level storage facility having a vertical, stationary center shaft and vertically extending, radially displaced outer supports with a plurality of horizontal beams that extend between said center shaft and said outer supports to which the ends of said beams are fixed providing a plurality of vertically spaced levels of horizontal beams,
   at least a pair of circular spaced rails fixed to the upper surface of said beams adjacent the outer ends thereof,
   a plurality of spider frames positioned to rotate around said shaft and having aircraft carrying stalls radially displaced from said center shaft,
   each of said spider frames have a unitary circular frame structure that is positioned above said circular rails and supports said stalls,
   said circular frame structure has roller means for rollably moving said circular frame structure on said rails,
   said circular frame structure and said aircraft stalls are solely supported by said rails,
   each of said spider frames includes a bearing connecting to said center shaft,
   and flexible tensioning means interconnecting said circular frame structure and said bearing connection for exerting hoop tension force therebetween.

2. In a storage system as claimed in claim 1 in which,
   said circular frame structure has a circular outer drive surface,
   drive belt means for abutting against only an arc section of said drive surface and rotating said spider frame,
   and means for providing positive engagement between said drive belt means and said drive surface.

3. In a storage system as claimed in claim 2 in which,
   said positive engagement means comprises teeth secured to said drive surface at spaced locations and pins secured to said drive belt means for engaging said teeth.

4. In a storage system as claimed in claim 1 in which,
   said flexible tensioning means comprise a plurality of rods with their ends connected to said circular frame structure and said bearing connection,
   and means for shortening the length of said rods.

5. In a storage system as claimed in claim 4 in which,
   said roller means includes wheel means depending from said circular frame structure for riding on said rails.

6. In a storage system as claimed in claim 4 in which,
   said storage facility includes a substantially cylindrical shaped enclosing housing,
   and said supports are a part of said housing.

7. In a storage system as claimed in claim 4 in which,
   said circular frame structure has a circumferential inner edge and a radially displaced circumferential outer edge with circumferentially displaced pairs of radially aligned rails defining separate stalls for supporting individual aircraft.

8. In a storage system as claimed in claim 7 in which,
   said roller means including individual pairs of inline wheels pivotally connected at the intersections of said pairs of radially aligned rails with said inner and outer edges of said frame structure.

* * * * *